(12) United States Patent
Trussler et al.

(10) Patent No.: US 8,410,389 B2
(45) Date of Patent: Apr. 2, 2013

(54) REMOTE DRIVE FOR DISCONNECTOR/ISOLATOR USED IN SWITCHGEAR

(75) Inventors: Richard M. Trussler, Murfreesboro, TN (US); Gregory B. Lee, Elgin, SC (US)

(73) Assignee: Schneider Electric USA, Inc., Palatine, IL (US)

( * ) Notice: Subject to any disclaimer, the term of this patent is extended or adjusted under 35 U.S.C. 154(b) by 508 days.

(21) Appl. No.: 12/648,694

(22) Filed: Dec. 29, 2009

(65) Prior Publication Data

US 2011/0155698 A1 Jun. 30, 2011

(51) Int. Cl.
*H01H 9/40* (2006.01)
(52) U.S. Cl. ............................................ 218/154; 218/7
(58) Field of Classification Search ................... 218/1–7, 218/14, 78–80, 84, 120, 140, 153, 154; 200/400, 200/401, 308, 500, 501
See application file for complete search history.

(56) References Cited

U.S. PATENT DOCUMENTS

| | | | |
|---|---|---|---|
| 3,801,768 A | 4/1974 | Meyer | |
| 4,693,132 A | 9/1987 | Buxton et al. | |
| 5,477,017 A | 12/1995 | Swindler et al. | |
| 6,144,002 A | 11/2000 | Coudert et al. | |
| 6,160,228 A | 12/2000 | Gerbert-Gaillard et al. | |
| 6,160,229 A | 12/2000 | Grelier et al. | |
| 6,777,627 B1 | 8/2004 | Stevenson | |
| 6,951,990 B1 | 10/2005 | Miller | |
| 7,091,439 B2 * | 8/2006 | Vaghini et al. | 218/154 |
| 7,897,890 B2 * | 3/2011 | Kikukawa et al. | 218/140 |
| 2003/0173336 A1 | 9/2003 | Thursesson et al. | |
| 2007/0138143 A1 | 6/2007 | Muench et al. | |
| 2010/0060469 A1 * | 3/2010 | Hetzmannseder et al. | 340/639 |

FOREIGN PATENT DOCUMENTS

WO 99/60591 A1 11/1999

OTHER PUBLICATIONS

Selected pages from 46032-700-09E.fm on Operating instructions for a Disconnector/isolator in a Motorpact IEC motor starter, Schneider Electric, May 2009 (7 pages).
CBS Arc Safe Remote Racking Systems for Circuit Breakers, http://www.remoterackingsolutions.com, 2008 (1 page).
Exploring Switchgear Maintenance Options, S. Vining, Square D Services, West Chester, OH, Plant Engineering, Feb. 2001 (2 pages).
Retro- and Upgrade Services, Remote Racking Systems for Medium Voltage Circuit Breakers, Schneider Electric, 2003 (1 page).

(Continued)

*Primary Examiner* — Amy Cohen Johnson
*Assistant Examiner* — Marina Fishman
(74) *Attorney, Agent, or Firm* — Nixon Peabody LLP

(57) ABSTRACT

A remotely controlled, motorized drive system for a disconnector used in switchgear. An operator pushes a button on a remote control, which signals a receiver in the disconnector to engage a motor that is coupled to a drive shaft. The drive shaft causes movable contacts of the disconnector to be moved into engagement or out of engagement with sets of fixed contacts in the switchgear that are connected to the line supply and to the circuit breaker that is bolted into the switchgear. One set of contacts is electrically coupled to the line supply, which can carry up to three phases of current. Another set of contacts is connected to corresponding terminals of the circuit breaker. A second motor controls movement of a grounding bar that grounds the circuit breaker to earth. Indicator lights on the switchgear panel indicate the position of the disconnector for visual confirmation of the same.

18 Claims, 6 Drawing Sheets

OTHER PUBLICATIONS

Masterpact® NT and NW Universal Power Circuit Breakers, Class 0613, Catalog 0613CT0001R4/08 2008, Schneider Electric, Apr. 2008 (184 pages).

Masterpact® NW Low-Voltage Power/Insulated Case Circuit Breaker Instruction Bulletin 48049-106-09, Doc. No. 0613EP0802, Schneider Electric, Jun. 2009 (97 pages).

Written Opinion corresponding to International Patent Application No. PCT/US2010/059438, European Patent Office, dated May 25, 2011, 8 pages.

International Search Report corresponding to International Patent Application No. PCT/US2010/059438, European Patent Office, dated May 25, 2011, 8 pages.

* cited by examiner

REMOTE DRIVE FOR DISCONNECTOR/ISOLATOR USED IN SWITCHGEAR

FIELD OF THE INVENTION

The present disclosure relates to racking mechanisms for a disconnector/isolator used in electrical switchgear, and, more particularly, to a remotely controlled motorized internal mechanism for a disconnector/isolator used in electrical switchgear equipment.

BACKGROUND

Electrical switchgear equipment (sometimes just called switchgear or a switchboard) house very large and heavy circuit breakers that protect loads that can consume thousands of amps of current. The procedure for making or breaking the electrical connections inside the switchgear between the circuit breaker and connectors in the switchgear is referred to as racking. Racking such high-capacity circuit breakers is a procedure wrought with personal danger to the operator's safety. A possibility always exists that an explosion will occur due to an arc flash, causing significant injury, including burns, or even death to the operator. There are at least two ways to carry out a racking operation in a switchgear. One way is to mount the circuit breaker to rails in the switchgear, and slide the circuit breaker into and out of a cradle of the switchgear. A hand crank is typically used to urge primary connectors of the circuit breaker to corresponding connectors in the switchgear, which are electrically coupled to the line supply. Another way is to securely bolt the circuit breaker to a frame of the switchgear without mounting the circuit breaker on rails, and operating a disconnector that is positioned between the circuit breaker and fixed contacts in the switchgear for coupling to the line supply and optionally ground. The disconnector operates movable contacts that move in a linear or rotary fashion and that make or break electrical connections between primary connectors of the circuit breaker and corresponding connectors in the switchgear.

Existing techniques have attempted to keep the operator a distance away from the circuit breaker while racking it into or out of the switchgear equipment; however, the operator is still required to be present in the same room and sometimes remain in close proximity to the circuit breaker within the blast range of an arc flash hazard. For example, some existing racking systems require the operator to insert a hand crank into the disconnector to carry out a racking operation. This puts the operator dangerously right in front of the circuit breaker and in the blast zone of an arc flash. Moreover, when an operator is present in the room in which switchgear equipment is housed, the operator is required to don protective gear to protect against arc flashes and other electrical hazards.

BRIEF SUMMARY

The present disclosure involves a switchgear in which a racking operation is performed by a disconnector or isolator interposed between a circuit breaker in the switchgear and fixed busbar contacts in the switchgear for coupling to one or more phases of a line supply and optionally to ground. The circuit breaker is typically fixed (such as held in place by screws, bolts, and the like) to an internal frame of the switchgear, and is not removable except by removing the bolts or screws that attach the circuit breaker to the frame. The disconnector, which can also be called an isolator, causes movable contacts to be electrically connected to and disconnected from fixed busbar contacts carrying line supply current in the switchgear.

To keep the operator a safe distance away from the switchgear during a racking operation in which the disconnector is placed in a service or isolated position or in optionally a grounded position, the present disclosure provides a motor that causes movable contacts of a motorized drive system to move between corresponding fixed contacts for connection to the busbars within the switchgear and to primary connectors of the circuit breaker fixedly mounted within the switchgear. The motor can be remotely controlled by a wired or wireless control device that permits the operator to be located a safe distance away from the switchgear and even outside the room in which the switchgear is located during a racking operation. On/off statuses of position switches placed in a path of a moving structure as the racking operation is performed can be used to stop the motor in response to the motorized drive system transitioning from one position to another.

Indicator lights visible through a front panel of the switchgear indicate with different colors the position of the disconnector (e.g., isolated or service or optionally grounded). In implementations that call for a grounded connection, the motorized drive system can further include a ground-bar engage motor that causes a ground shorting bar to be connected to and disconnected from fixed main ground bars that are electrically coupled to a main ground busbar in the switchgear. The ground-bar engage motor is activated in response to the motorized drive system being transitioned into the grounded position in which the movable contacts are shorted together and to ground by the connection of the ground shorting bar to the fixed ground contacts in the switchgear.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
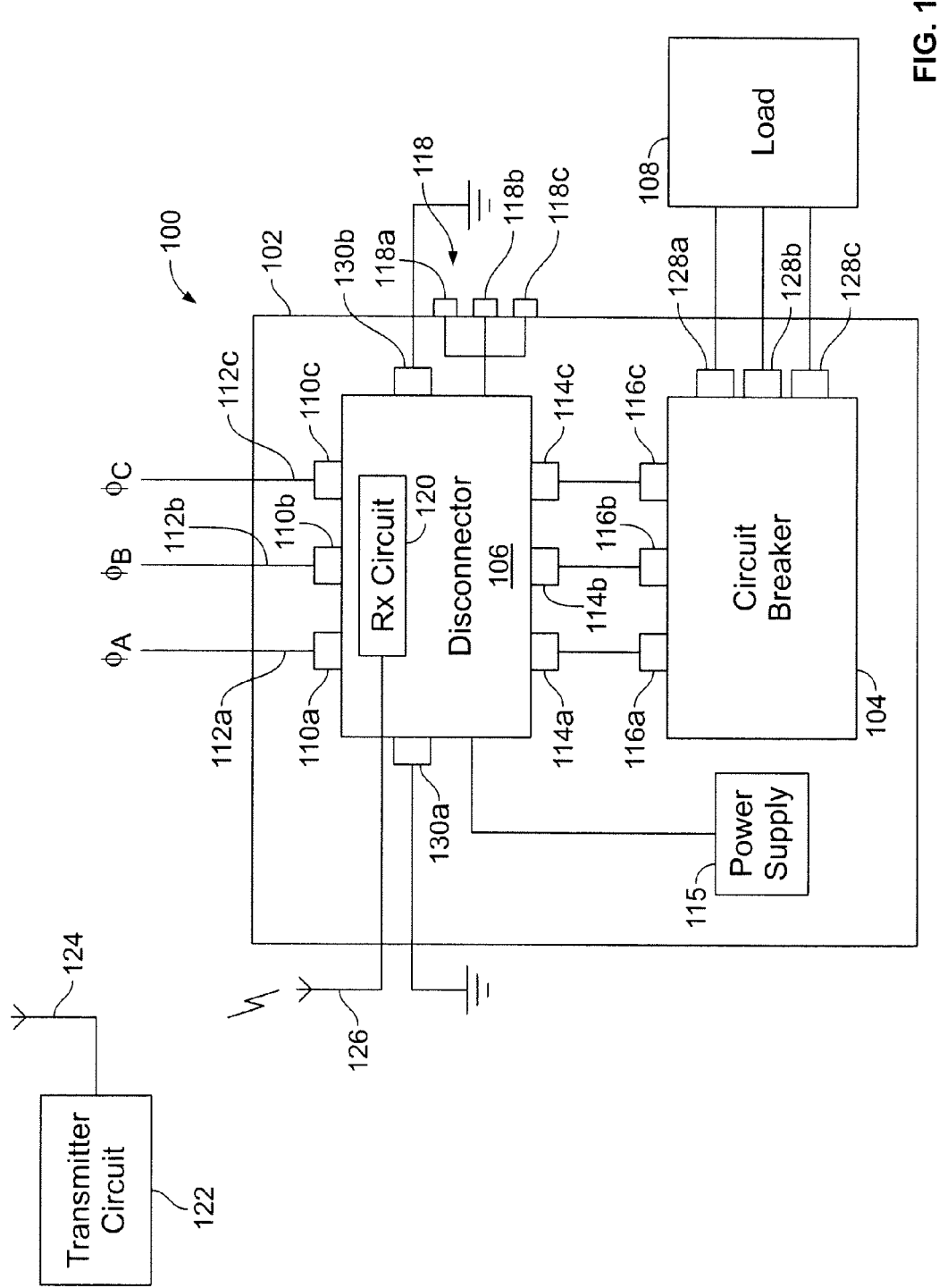
FIG. 1 is a functional block diagram of a disconnector that includes a remotely operated motorized drive system according to aspects of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is a functional block diagram of an electrical switchgear apparatus 100 (variously called switchgear or a switchboard) that resembles a large standing cabinet. The switchgear 100 can have a high, medium, or low voltage rating as defined by the American National Standards Institute (ANSI) or can refer to a switchboard as defined in Underwriters Laboratory Standard UL891. The switchgear 100 has a conventional rigid metal frame or cabinet 102 for housing one or more circuit breakers 104 and a disconnector 106 (also called an isolator) interposed between the circuit breaker 104 and three electrical phases $\emptyset_A, \emptyset_B, \emptyset_C$ of an electrical line supply that is conventionally supplied external to the switchgear 100. The circuit breaker 104 is fixed to the metal frame 102 of the switchgear 100 by screws or bolts or the like. In this example, the switchgear 100 lacks a draw-in/draw-out racking mechanism with movable rails for racking the circuit breaker 104 into and out of the switchgear. In this example, the circuit breaker 104 is securely fixed to the frame 102 of the switchgear and is removable from the switchgear 100 by unscrewing or unbolting the circuit breaker 104 from the frame 102. As will be explained in more detail below, the disconnector 106 serves to make or break electrical connections between the line supply and optionally ground (or earth) and the circuit breaker 104, which is electrically coupled to a load 108 that is protected by the circuit breaker 104.

Disconnectors can be one of two types: rotary or linear. Rotary disconnectors can be mounted within the cabinet of the switchgear 100 in a transverse or axial manner, as is known. Linear disconnectors can be mounted within the cabinet of the switchgear 100 in a vertical or horizontal manner, as is also known. Any disconnector disclosed herein, including the disconnector 106, can be of the transverse rotary, axial rotary, horizontally mounted linear, or vertically mounted linear types, and the present disclosure is explicitly intended to cover all types and mounting orientations of disconnectors. The disconnector 106 includes a motorized drive system, described in more detail below, for automatic control of movable contacts that make or break the electrical connections between the line supply to the switchgear 100 and the circuit breaker 104.

The circuit breaker 104 has conventional open, closed, and tripped positions that supply electrical current to the load 108 in the closed position, interrupt the flow of current in the tripped position when the circuit breaker 104 detects or senses an electrical fault condition such as a short circuit, an overvoltage, an arc fault, or a ground fault, or prevent the flow of current in the open position when movable contacts in the breaker are physically separated by a gap from stationary contacts. The circuit breaker 104 can have a rating on the order of thousands of amps of current. These circuit breakers can be very large and bulky, weighing hundreds of pounds and requiring mechanized equipment or multiple people to install and mount them into the switchgear. The circuit breaker 104 is connected to the load 108 via conventional terminals 128a,b,c.

The disconnector 106 serves to physically and electrically disconnect the circuit breaker 104 from electrical current supplied to the switchgear 100. To do so, a set of fixed busbar contacts 110a,b,c are fixed within the switchgear and electrically coupled to respective line supply busbars 112a,b,c, which are each electrically coupled to a respective electrical phase $\emptyset_A, \emptyset_B, \emptyset_C$ of the line supply. The line supply busbars 112a,b,c conventionally run horizontally or vertically in the switchgear to distribute each phase of the line supply to various protection and distribution components within the switchgear. It should be noted that more than one circuit breaker 104 can be installed into the switchgear. The switchgear 100 also houses a set of fixed breaker contacts 114a,b,c that are fixed within the switchgear 100 and are electrically coupled to corresponding connectors 116a,b,c inside the switchgear 100 cabinet. As mentioned above the form factor of the disconnector 106 can be of the rotary or linear type, and the disconnector 106 can have a transverse, axial, vertical, or horizontal mounting orientation within the switchgear 100.

Optionally, the disconnector 106 can include a removable connection to ground (earth) via fixed main ground bars 130a,b that are fixed within the switchgear 100. The fixed main ground bars 130a,b are conventionally coupled to ground via a ground connection.

Visible from a front panel of the frame 102 is a light indicator assembly 118 that includes three light indicators, a service light indicator 118a, an isolated light indicator 118b, and an optional ground light indicator 118c. These light indicators, as explained below, are used for visually indicating a position or configuration of the disconnector 106. The disconnector 106 includes a receiver circuit 120, described in more detail below, for receiving a signal instruction that is generated by a transmitter circuit 122 that is external to and remote from the switchgear 100. The receiver circuit 120 can include a conventional electronic controller and associated electronic circuitry and is operable to cause the disconnector 106 to change its configuration or position as described in more detail below. The signal instruction can be transmitted across a wire conductor (not shown) from the transmitter circuit 122 to the receiver circuit 120, or the signal instruction can be transmitted wirelessly from the transmitter circuit 122 to the receiver circuit 120 via a wireless transmitter 124 to a wireless receiver 126, respectively. The signal instruction can be communicated using infrared, radio frequency, microwave, or other suitable means of light energy or electromagnetic transmission.

The reference numbers used in FIG. 1 shall be retained in subsequent figures where they refer to the same element. FIG. 1 is a functional block diagram of some components and elements of the present disclosure, and these items are given the same reference number in other figures. Additional or new items are assigned a new reference number, starting with the number of the figure.

Figure 2:
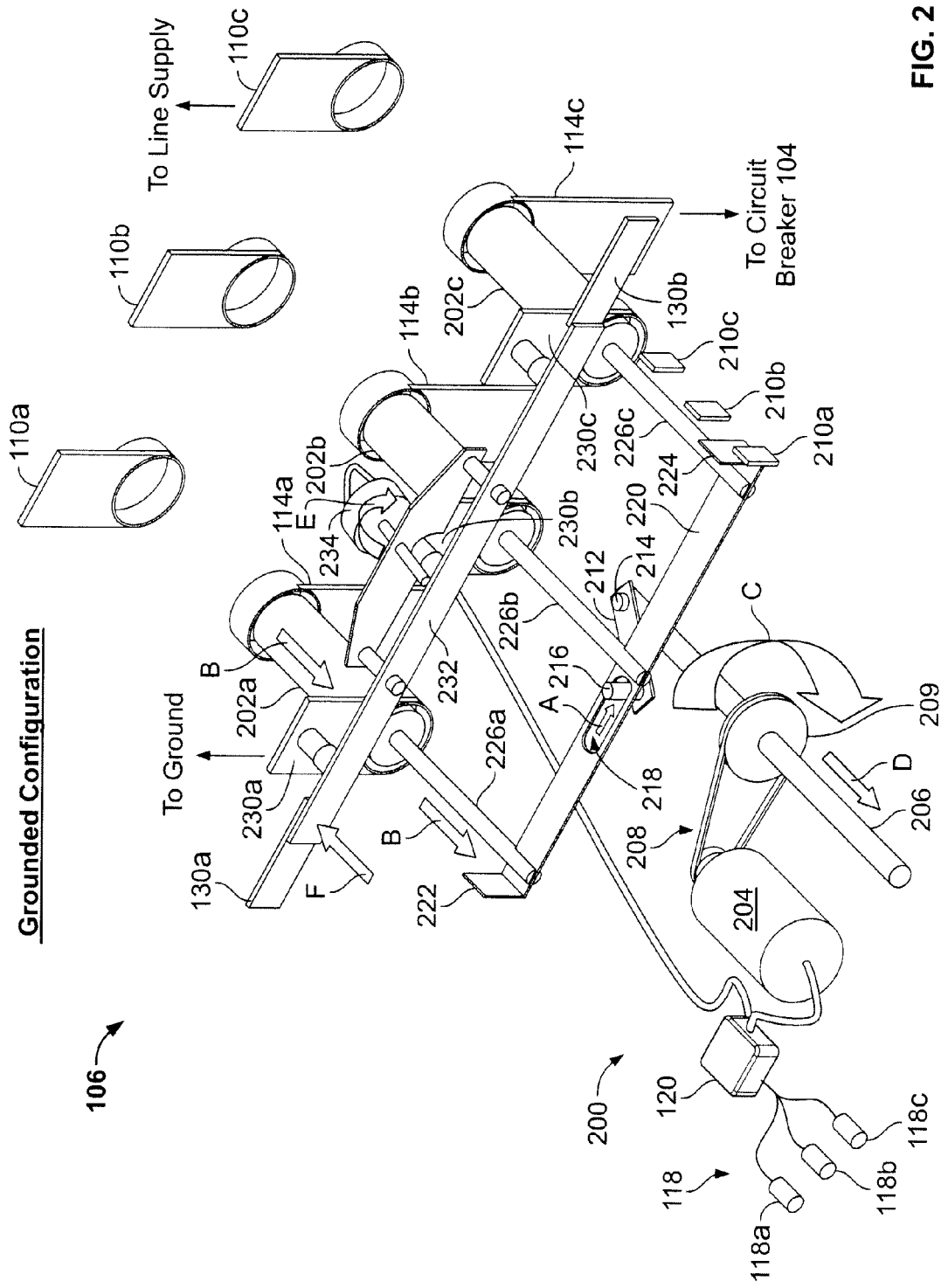
FIG. 2 is a perspective view of a motorized drive system in a grounded configuration.
Figure 3:
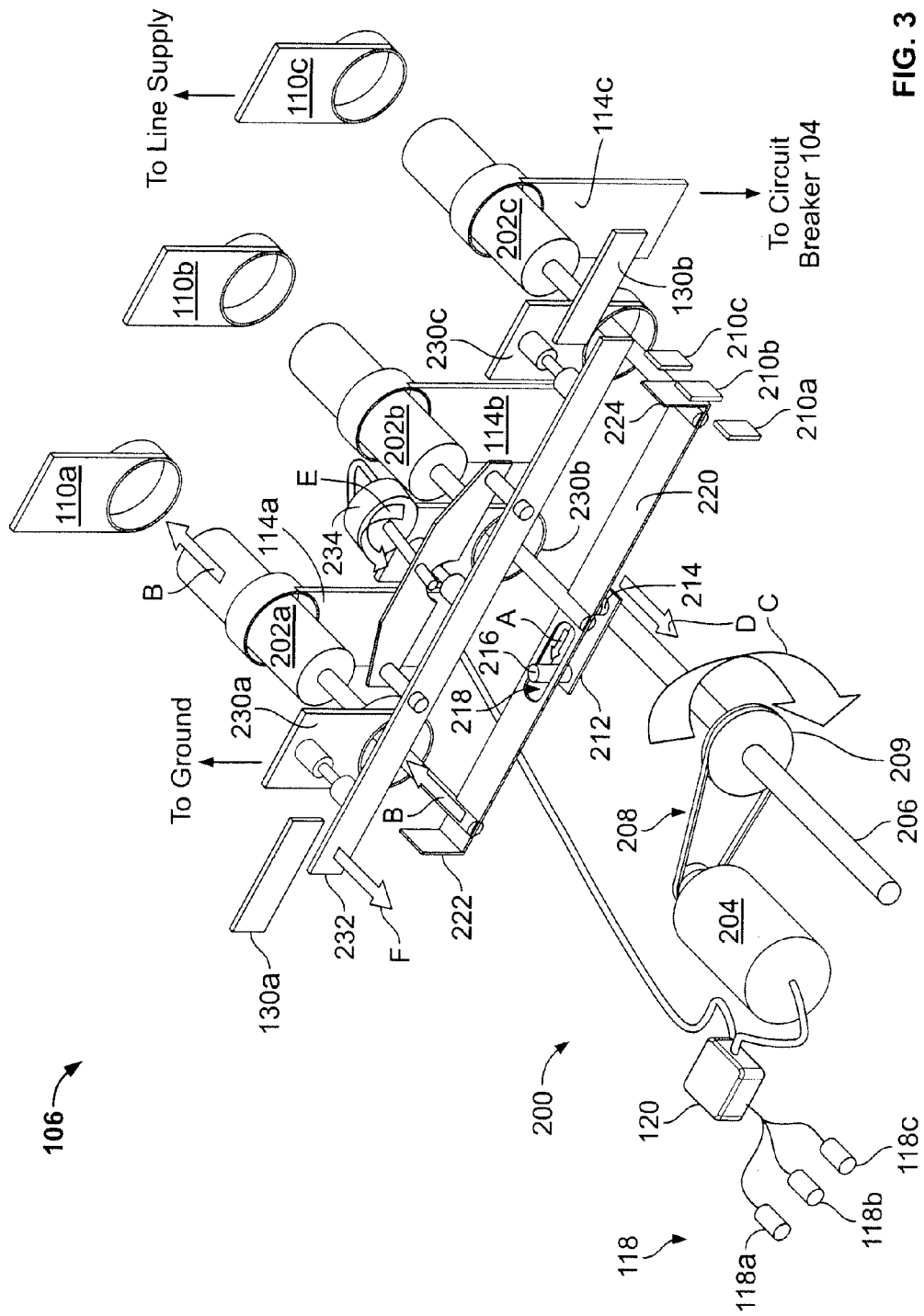
FIG. 3 is a perspective view of the motorized drive system shown in FIG. 2 in an isolated configuration.
Figure 4:
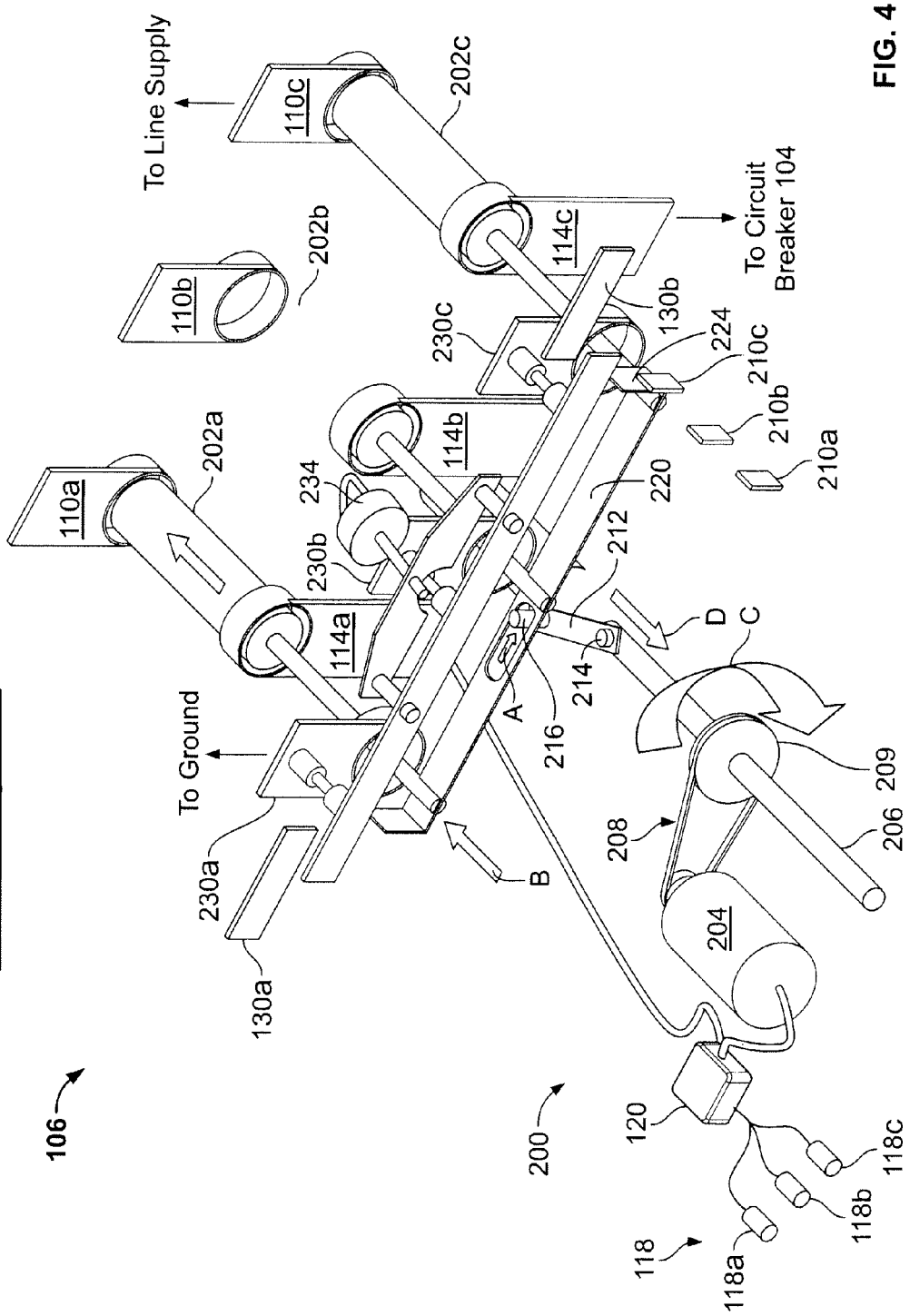
FIG. 4 is a perspective view of the motorized drive system shown in FIG. 2 in a service configuration.

Referring now to FIGS. 2-4, a motorized drive system 200 is shown for the disconnector 106 shown in FIG. 1 in various configurations. FIG. 2 shows the motorized drive system 200 in an optional grounded configuration. FIG. 3 shows the motorized drive system 200 in an isolated configuration. FIG. 4 shows the motorized drive system 200 in a service configuration. Each of these configurations will be described next. The motorized drive system 200 shown in FIG. 4 is for a linear type disconnector mounted horizontally (relative to earth) within the switchgear cabinet, where movable contacts of the disconnector move in a linear direction to connect and disconnect the load 108 protected by the circuit breaker 104 to and from the line supply. But, as discussed above, the motorized drive system of the present disclosure can be incorporated into any other type of disconnector in any mounting orientation.

The motorized drive system 200 includes three fixed busbar contacts 110a,b,c, one for each phase of the line supply, which are fixed within the switchgear 100 and electrically coupled to the corresponding horizontal or vertical line supply busbars 112a,b,c (shown in FIG. 1) within the switchgear 100, which is electrically coupled to the line supply external to the switchgear 100. The motorized drive system 200 includes three fixed breaker contacts 114a,b,c, one for each phase of the line supply, which are also fixed within the switchgear 100 and electrically coupled to the circuit breaker 104 that is fixedly mounted within a cabinet 102 of the switchgear by bolts, screws, or the like. The motorized drive system 200 includes three movable contacts 202a,b,c that are electrically conductive and movable among various positions to put the motorized drive system 200 into one of several configurations (e.g., isolated, service, or optionally grounded) under control of a motor 204, which is fixed within the switchgear 100 and coupled to the movable contacts 202a,b,c such that rotation of the motor 204 causes the movable contacts 202a,b,c to move among the various positions (e.g., isolated, service, or optionally grounded). The movable contacts 202a, b,c are rods having a cylindrical shape. Coupled to the motor by a gear or belt assembly 208 is a drive shaft 206, which is manually rotated by a conventional manual crank (not shown) or automatically under electronic control of the motor 204. The belt assembly 208 includes a clutch drive gear 209 that engages or disengages the belt assembly 208 from the motor 204 depending on whether a manual crank is employed to rotate the drive shaft 206.

The drive shaft 206 is attached to a rotating drive link 212 by a fixed pin 214 connecting the drive shaft 206 to one end of the rotating drive link 212. The other end of the rotating drive link 212 carries a slot-receiving pin 216 that is received in a slot 218 formed in a drive bar 220 that has at each end thereof a corresponding tab 222, 224. Fixed to the drive bar 220 are three movable-contact drive shafts 226a,b,c, each attached to the three movable contacts 202a,b,c, respectively. The drive bar 220 is transverse to a length of the drive shaft 206. Rotation of the drive shaft 206 causes the rotating drive link 212 to rotate about the fixed pin 214, causing the slot-receiving pin 216 to slide in the slot 218 of the drive bar 220 and move the drive bar 220 in a direction A along an axis extending along the major length of the drive bar 220, causing the three movable contacts 202a,b,c to move in a linear direction B along the axis among the various positions.

Each of the fixed breaker contacts 114a,b,c and each of the fixed busbar contacts 110a,b,c have a circular opening for receiving therein respective ones of the cylindrically or rod-shaped movable contacts 202a,b,c as they are caused to be moved by the motor 204 among the various positions. When a movable contact 202 is received in a corresponding pair of contacts 110, 114, an electrically conductive path is established across the contact pair 110, 114 so that electrical current can flow from one contact 110 to the other contact 114.

The motorized drive system 200 includes three switches 210a,b,c, such as microswitches, which are positioned to close in response to the motorized drive system 200 being in the isolated or service configurations. The switch 210b is positioned to close when the tab 224 is moved under control of the motor 204 to a position corresponding to the switch 210b. Closure of the switch 210b (FIG. 3) causes the motor 204 to turn off and cease rotating and causes the isolated light indicator 118b to turn on and indicate that the motorized drive system 200 is in the isolated configuration. Likewise, closure of the switch 210c (FIG. 4) causes the motor 204 to turn off and also causes the service light indicator 118a to turn on and indicate that the motorized drive system 200 is in the service configuration.

An implementation of the motorized drive system 200 includes one or more fixed breaker contacts and one or more fixed busbar contacts to place the motorized drive system 200 into the service or isolated configurations. However, in an optional implementation, the motorized drive system 200 can also be placed into a grounded configuration, which will be described next in connection with FIG. 2.

The motorized drive system 200 includes three fixed ground contacts 230a,b,c fixed within the switchgear and electrically coupled to the main ground busbars 130a,b that are electrically coupled to ground. The motorized drive system 200 also includes a third switch 210a positioned to close in response to the motorized drive system 200 being in the grounded configuration. The motorized drive system 200 includes a ground shorting bar 232 removably connected to the fixed main ground bars 130a,b that are electrically coupled to a main ground busbar in the switchgear 100. The ground shorting bar 232 is movable among a ground-engaged position (shown in FIG. 2) and a ground-isolated position (shown in FIGS. 3 and 4). The ground shorting bar 232 electrically shorts the three fixed ground contacts 230a,b,c together and is electrically connected to the fixed main ground bar in the ground-engaged position (FIG. 2). The ground shorting bar 232 is electrically isolated from the three fixed ground contacts 230a,b,c and from the fixed main ground bars 130a,b in the ground-isolated position (FIGS. 3 and 4). The motorized drive system includes a ground-bar engage motor 234 mechanically coupled to the ground shorting bar 232 such that rotation of the ground-bar engage motor 234 causes the ground shorting bar 232 to move among the ground-engaged position and the ground-isolated position. Closure of the third switch 210a (shown in FIG. 2) can cause the grounded light indicator 118c to be turned on indicating that the motorized drive system 200 is in the grounded configuration. As described below, other conditions can be required before the grounded light indicator 118c is turned on, such as requiring the circuit breaker 104 to be in a closed position in which movable contacts of the circuit breaker 104 are contacting stationary contacts of the circuit breaker 104 that are electrically coupled to the fixed breaker contacts 114a,b,c, or requiring additionally or alternately that the ground shorting bar 232 be in the ground-engaged position (as shown in FIG. 2).

Operation of the motorized drive system 200 can be carried out as follows. A signal instruction is transmitted from the transmitter circuit 122 across a wired or wireless medium. The signal instruction is received by the receiver circuit 120, which instructs the receiver circuit 120 to move the motorized drive system 200 from one configuration to another. For example, the transmitter circuit 122 can resemble a remote control such as used for controlling televisions, with one or more buttons for generating signal instructions. In implementations in which multiple switchgears are located in the same switchgear room, each button can control a corresponding motorized drive system within each of the respective switchgears in the switchgear room. Additional buttons, such as ones labeled service and isolated, can be present on the remote control for instructing the motorized drive system to be placed into the service or isolated configurations. In FIG. 2, a configuration of the motorized drive system 200 has been changed from an isolated configuration (FIG. 3) to an optional grounded configuration as shown. In response to the receiver circuit 120 receiving the signal instruction from the transmitter circuit 122, the receiver circuit 120 signals to the motor 204 to turn on, which causes the clutch drive gear 209 to rotate in the direction of arrow C, causing the movable contacts 202a,b,c to move together in the direction of arrow B. The rotation of the clutch drive gear 209 engages threads on the drive shaft 206, causing the drive shaft 206 to move in a direction of arrow D, which rotates the rotating drive link 212 about its pivot pin 214, thereby pulling the slot-receiving pin along the direction of arrow A in the slot 218 formed in the drive bar 220. When the tab 224 closes the switch 210a, the motor 204 stops rotating, and the motorized drive system 200 is now in the grounded configuration. In the optional grounded configuration, the movable contacts 202a,b,c electrically short the fixed ground contacts 230a,b,c to the fixed breaker contacts 114a,b,c, which connects the circuit breaker 104 to ground. Tests, such as a ground fault test, can be performed on the circuit breaker 104 in this grounded configuration, for example.

Optionally, the receiver circuit 120 can also instruct the ground-bar engage motor 234 to rotate in a direction of arrow E to cause the ground shorting bar 232 to move in a direction of arrow F and eventually physically contact the fixed main ground bars 130a,b, thereby grounding the movable contacts 202a,b,c. The change in positions in the ground shorting bar 232 relative to the fixed main ground bars 130a,b can be seen by comparing FIG. 3 with FIG. 2. The ground-bar engage motor 234 can be turned on or off independently of the motor 204. Alternately, the ground-bar engage motor 234 can be turned on in response to the tab 224 closing the switch 210a, whereupon the ground-bar engage motor 234 is turned on to move the ground shorting bar 232 from an ground-isolated position (shown in FIG. 3) to a ground-engaged position (shown in FIG. 2). A position switch (not shown) can be positioned in a path of the ground shorting bar 232 such that when the ground shorting bar 232 contacts the fixed main ground bars 130a,b, the position switch is closed, sending a signal back to the receiver circuit 120 to turn off the ground-bar engage motor 234. Although switches are described herein as a way of detecting when a load connected to a motor has reached an intended position, other ways of detection are contemplated, such as by counting the number of rotations of the motor while accounting for slip and load size.

As discussed above, the receiver circuit 120 can illuminate the optional ground light indicator 118c when at least one condition is satisfied. At a minimum, the condition must include that the movable contacts 202a,b,c are positioned to short the fixed ground contacts 230a,b,c with the fixed breaker contacts 114a,b,c. However, the receiver circuit 120 can require that additional conditions be satisfied before illuminating the optional ground light indicator 118. For example, logic in the receiver circuit 120 can determine whether the following logical conditions are true: (1) the movable contacts 202a,b,c are shorting the fixed ground contacts 230a,b,c to the fixed breaker contacts 114a,b,c; (2) the ground shorting bar 232 is shorting the fixed main ground bars 130a,b; and (3) the circuit breaker 104 is in the closed position (e.g., as opposed to the open or tripped positions). Preferably, the ground indicator light 118c is green to indicate that it is safe to approach the switchgear 100.

To transition the motorized drive system 200 out of the grounded configuration shown in FIG. 2 and into the isolated configuration (FIG. 3), the receiver circuit 120 receives a signal instruction from the transmitter circuit 122 that indicates that the motorized drive system 200 is to be changed. Referring to FIG. 3, upon reception of the signal instruction, the receiver circuit 120 causes the motor 204 to turn on, rotating the clutch drive gear 209 in the direction of arrow C, which operates on the threads of the drive shaft 206, moving it in the direction of arrow D. The rotation of the clutch drive gear 209 in direction C engages the threads on the drive shaft 206, causing the rotating drive link 212 to rotate about its pivot pin 214, thereby pushing the slot-receiving pin along the direction of arrow A in the slot 218 formed in the drive bar 220. As a result, the drive bar 220 is forced to move in the direction of arrow B, moving the movable contacts 202a,b,c away from the fixed ground contacts 230a,b,c. When the tab 224 reaches the switch 210b, the switch 210b closes, causing the receiver circuit 120 to turn off the motor 204. The movable contacts 202a,b,c are not connected between any pairs of fixed contacts, thereby preventing the flow of electrical current from the line supply across the circuit breaker 104.

In addition to rotating the motor 204, the receiver circuit 120 causes the ground-bar engage motor 234 to rotate in the direction of arrow E shown in FIG. 3, which is the opposite direction that the motor 234 rotates to engage the ground shorting bar 232 to the fixed main ground bars 130a,b. The rotation of the motor 234 causes the ground shorting bar 232 to disengage from the fixed main ground bars 130a,b by moving in a direction of arrow F shown in FIG. 3.

In response to the ground shorting bar 232 being disengaged from the fixed main ground bars 130a,b and the movable contacts 202a,b,c being isolated from any pair of fixed contacts, the receiver circuit 120 causes the isolated light indicator 118b to be illuminated, preferably with a yellow color, to indicate that the disconnector 106 is in the isolated configuration. In this isolated configuration, the circuit breaker 104 can be electrically interlocked so that it cannot be placed into the closed position.

To transition the motorized drive system 200 out of the isolated configuration shown in FIG. 3 and into the service configuration (FIG. 4), the receiver circuit 120 receives a signal instruction from the transmitter circuit 122 that indicates that the motorized drive system 200 is to be changed. Optionally, the receiver circuit 120 can receive a signal from the circuit breaker 104 indicating its position (closed, open, or tripped), and the receiver circuit 120 can deny the instruction if the circuit breaker 104 is indicated to be in the closed position. In this manner, the disconnector 106 is electrically interlocked with the circuit breaker 104.

Referring to FIG. 4, upon reception of the signal instruction, the receiver circuit 120 causes the motor 204 to turn on, rotating the clutch drive gear 209 in the direction of arrow C, which operates on the threads of the drive shaft 206, moving it in the direction of arrow D. The rotation of the clutch drive gear 209 in direction C engages the threads on the drive shaft 206, causing the rotating drive link 212 to rotate about its pivot pin 214, thereby pulling the slot-receiving pin along the direction of arrow A in the slot 218 formed in the drive bar 220. As a result, the drive bar 220 is moved in the direction of arrow B, moving the movable contacts 202a,b,c toward the fixed busbar contacts 110a,b,c. When the tab 224 reaches the switch 210c, the switch 210c closes, causing the receiver circuit 120 to turn off the motor 204. The movable contacts 202a,b,c are connected between the fixed breaker contacts 114a,b,c and the fixed busbar contacts 110a,b,c, allowing the flow of electrical current from the line supply across the circuit breaker 104 when the circuit breaker 104 is closed.

In response to the receiver circuit 120 detecting that the switch 210c has closed, the receiver circuit 120 causes the service indicator light 118a to turn on, indicating that the disconnector 106 is in the service configuration. Preferably, the service indicator light 118 is red, to indicate that the circuit breaker 104 is connected to the line supply in the switchgear 100.

The motor 204 and other electronic components of the motorized drive system 200 can be powered from a power supply derived from the line supply or from a power supply 115 (FIG. 1) isolated from the line supply and housed entirely within the switchgear, such as a rechargeable battery whose charge can be maintained by a current derived from the line supply.

It should be noted that although three busbar contacts 110a,b,c, three breaker contacts 114a,b,c, and three movable contacts 202a,b,c are shown in FIGS. 2-4, it will be readily appreciated that one or two contacts can be used in alternate implementations in which the line supply comprises a single phase or two phases, respectively.

Although two different motors 204, 234 are disclosed for separately controlling the movement of the drive bar 220 and the ground shorting bar 232, respectively, the present disclosure contemplates using a single motor to move the drive bar 220 and the ground shorting bar 232.

The disconnector 106 shown in FIGS. 2-4 is mounted horizontally within the switchgear 100, though in an alternate implementation, the disconnector 106 can be mounted vertically.

Figure 5:
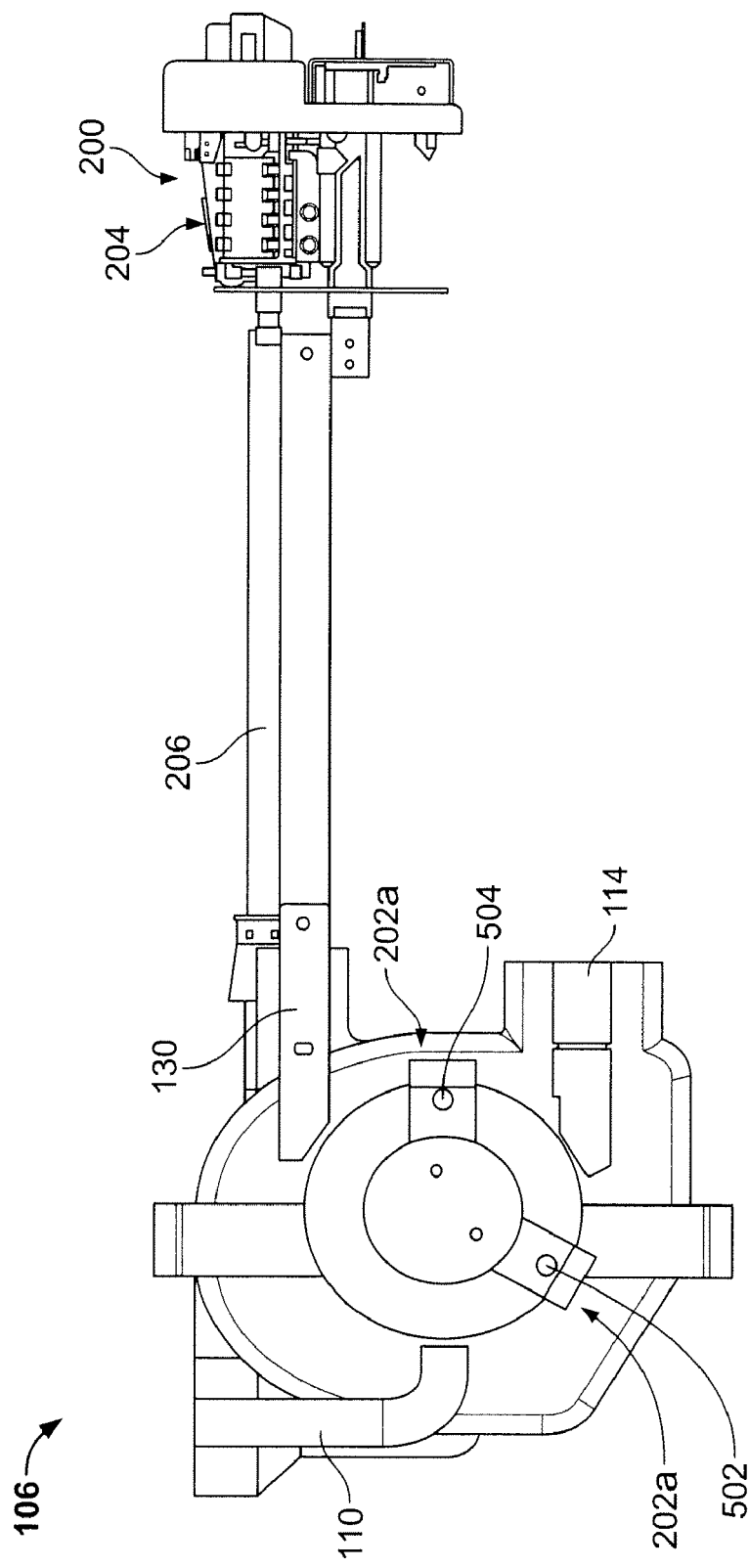
FIG. 5 is a side view of a rotary-type disconnector with a motorized drive system according to aspects of the present disclosure.

As discussed above, FIGS. 2-4 show an example of a linear-type disconnector according to aspects of the present disclosure for use in the switchgear 100, but it is equally contemplated that the motorized drive system 200 and other aspects disclosed herein can be incorporated into other types of disconnectors, such as a rotary-type disconnector. For example, FIG. 5 illustrates a side view of a rotary disconnector 106 together with a motorized drive mechanism 200 configured to cause the movable contacts 202a,b of the rotary disconnector 106 among service, isolated, and grounded configurations. In the configuration shown in FIG. 5, the rotary disconnector 106 is in an isolated configuration, because the movable contacts 202a,b are not electrically connected to any of the fixed contacts 110, 114, 130 (the fixed ground contacts 130 are optional). Only one set of fixed contacts is shown in the side view of FIG. 5 to support a single-phase line supply, though optionally up to three sets of fixed contacts, such as shown in FIG. 6, can be present in the rotary disconnector 106 to support a three-phase line supply.

The motorized drive system 200 includes the motor 204 that drives the drive shaft 206. The motor 204 can directly drive a clutch drive gear 209 (not shown in FIG. 5) that engages or disengages the motor 204 from the drive shaft 206 depending on whether a manual crank is employed to rotate the drive shaft 206. Although the clutch drive gear 209 is not shown in FIG. 5, those of ordinary skill in the art will readily appreciate that the motor 204 can be positioned against the clutch drive gear 209, which is mechanically coupled to the drive shaft 206 to directly drive the drive shaft 206. Position switches or sensors proximate the movable contacts 202a,b can be positioned to send signals back to the receiver circuit 120 of the motorized drive system 200 to indicate when the movable contacts 202a,b are positioned to put the disconnector 106 in service, isolated, or grounded configurations. When the movable contacts 202a,b shown in FIG. 5 rotated to be connected across the fixed busbar contact(s) 110 and the fixed ground contact(s) 130, the disconnector 106 is in the grounded configuration. When the movable contacts 202a,b are rotated to be connected across the fixed busbar contact(s) 110 and the fixed breaker contact(s) 114, the disconnector 106 is in the service configuration.

Figure 6:
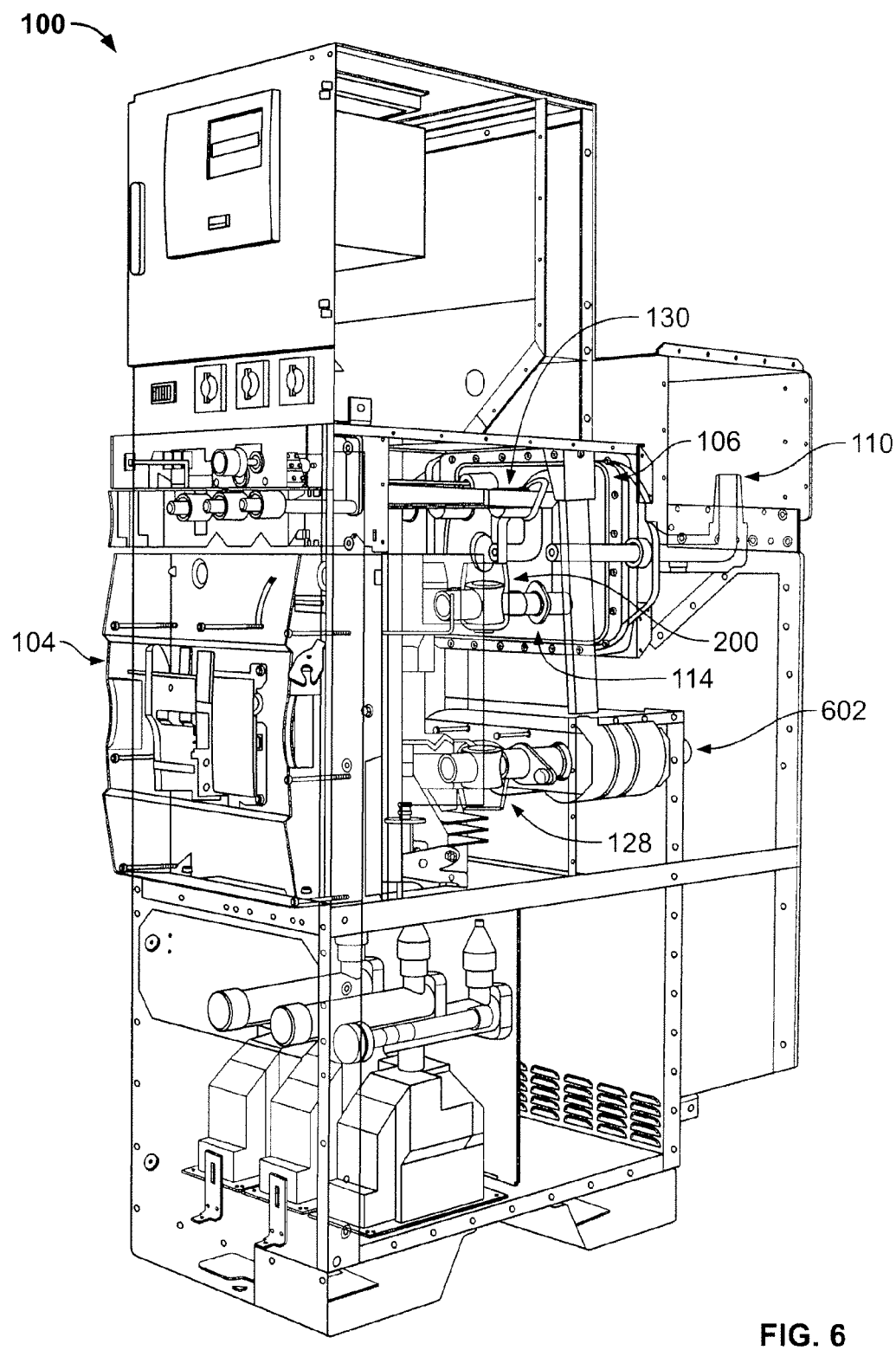
FIG. 6 is a perspective view of a switchgear that houses the rotary-type disconnector shown in FIG. 5.

FIG. 6 is a cut-away perspective view of an example switchgear 100 to illustrate an example position of a rotary disconnector 106 within the switchgear 100. Cable connections 602 are available for connecting cables between the conventional terminals 128 of the circuit breaker 104 and the load 108. An advantage of the motorized drive system 200 of the present disclosure is that it requires no change to a configuration of existing switchgear. The motorized drive system 200 can be readily incorporated and retrofitted into existing switchgear without requiring a redesign of the switchgear's internal structures. The purpose of FIG. 6 is simply to illustrate an example of the disconnector 106 according to aspects of the present disclosure incorporated into a switchgear 100.

Advantageously, the operator need not even be physically present in the same room as the switchgear 100 is located, and can from a safe distance remotely perform a racking operation to move the disconnector 106 among service or isolated positions and optionally a grounded position. The operator can control multiple switchgear equipment using a single remote control device, and the indicator lights allow the operator to visibly confirm the position or configuration of the disconnector 106 in the switchgear 100 without having to be physically near the switchgear 100. No external dolly or mechanism needs to be physically coupled with any part of the switchgear 100 to perform a racking operation. These and other advantages are achieved with the disconnector described in this disclosure.

While particular implementations and applications of the present disclosure have been illustrated and described, it is to be understood that the disclosure is not limited to the precise construction and compositions disclosed herein and that various modifications, changes, and variations can be apparent from the foregoing descriptions without departing from the spirit and scope of the invention as defined in the appended claims.

What is claimed is:

1. A motorized drive system for a disconnector used in electrical switchgear, comprising:
    a fixed busbar contact fixed within the switchgear and electrically coupled within the switchgear to a line supply busbar that is electrically coupled to a line supply external to the switchgear;
    a fixed breaker contact fixed within the switchgear and electrically coupled to a circuit breaker fixedly mounted within the switchgear;
    a movable contact that is electrically conductive and movable to a first position to electrically connect the fixed busbar contact with the fixed breaker contact in a service configuration and to a second position to electrically disconnect the fixed busbar contact from the fixed breaker contact and thereby disconnect the circuit breaker from the line supply in an isolated configuration; and
    a motor fixed within the switchgear and coupled to the movable contact such that rotation of the motor causes the movable contact to move between the first and the second positions
    wherein the first fixed busbar contact includes three fixed busbar contacts each fixed within the switchgear and each electrically coupled to respective ones of three line supply busbars each electrically coupled to a distinct phase of the line supply,
    wherein the fixed breaker contact includes three fixed breaker contacts each fixed within the switchgear and electrically coupled to a corresponding connector of the circuit breaker for supplying a respective one of the distinct phases to the circuit breaker,
    wherein the movable contact includes three movable contacts that are electrically conductive, and
    wherein the motor is coupled to the three movable contacts such that rotation of the motor causes the three movable contacts to move together between the first and second positions; and
    a drive shaft coupled to the motor by a gear or belt assembly; and
    a drive bar coupled to the drive shaft and transverse to a length of the drive shaft, the drive bar being configured to cause, under rotation of the drive shaft, the three movable contacts to move among the first and second positions.

2. The motorized drive system of claim 1, further comprising a drive shaft coupled to the motor by a gear or belt assembly.

3. The motorized drive system of claim 1, further comprising:
- a first switch positioned to close in response to the motorized drive system being in the isolated configuration;
- a second switch positioned to close in response to the motorized drive system being in the service configuration; and
- a light indicator assembly that includes a service light indicator for indicating that the motorized drive system is in the service configuration and an isolated light indicator for indicating that the motorized drive system is in the isolated configuration, the service and isolated light indicators being visible from a front panel of the switchgear,
- the isolated light indicator being switched on in response to the first switch being closed, and the service light indicator being switched on in response to the second switch being closed.

4. The motorized drive system of claim 1, further comprising a fixed ground contact fixed within the switchgear and electrically coupled to a main ground busbar that is electrically coupled to ground, the motor causing the movable contact to move into and out of a third position in which the movable contact electrically connects the fixed ground contact to the fixed breaker contact.

5. The motorized drive system of claim 4, further comprising:
- a first switch positioned to close in response to the motor drive system being in the isolated configuration;
- a second switch positioned to close in response to the motor drive system being in the service configuration;
- a third switch positioned to close in response to the movable contact being in the third position; and
- a light indicator assembly that includes a service light indicator for indicating that the motorized drive system is in the service configuration, an isolated light indicator for indicating that the motorized drive system is in the isolated configuration, and a grounded light indicator for indicating that the motorized drive system is in a grounded configuration.

6. The motorized drive system of claim 1, wherein:
the drive bar for receiving therein a slot-receiving pin of a rotating drive link also having a fixed pin connected to the drive shaft such that rotation of the drive shaft causes the rotating drive link to rotate about the fixed pin, causing the slot-receiving pin to slide in the slot of the drive bar and move the drive bar in a direction along an axis extending along the length of the drive bar, causing the three movable contacts to move in a linear direction along the axis among the first and second positions.

7. The motorized drive system of claim 6, where the movable contacts are rods having a cylindrical shape, where each of the fixed breaker contacts and each of the fixed busbar contacts have a circular opening for receiving therein respective ones of the movable contacts as they are caused to be moved by the motor among the first and second positions, wherein the disconnector is a linear disconnector in which the movable contacts move in a linear direction to connect and disconnect the load protected by the circuit breaker to and from the line supply.

8. The motorized drive system of claim 1, wherein the circuit breaker is a medium-voltage circuit breaker and is bolted to a frame of the switchgear, and wherein the disconnector is a linear disconnector mounted horizontally relative to earth within the switchgear.

9. The motorized drive system of claim 1, further comprising a receiver circuit that receives a signal instruction that is generated external to and remote from the electrical switchgear, the receiver circuit being operable to cause the motor to turn in response to receiving the signal instruction.

10. The motorized drive system of claim 9, wherein the signal instruction is transmitted across a wire conductor from a transmitter circuit external to and remote from the electrical switchgear to the receiver circuit.

11. The motorized drive system of claim 9, wherein the signal instruction is transmitted wirelessly from a transmitter circuit external to and remote from the electrical switchgear to the receiver circuit.

12. A motorized drive system for a disconnector used in electrical switchgear comprising:
- a fixed busbar contact fixed within the switchgear and electrically coupled within the switchgear to a line supply busbar that is electrically coupled to a line supply external to the switchgear;
- a fixed breaker contact fixed within the switchgear and electrically coupled to a circuit breaker fixedly mounted within the switchgear;
- a movable contact that is electrically conductive and movable to a first position to electrically connect the fixed busbar contact with the fixed breaker contact in a service configuration and to a second position to electrically disconnect the fixed busbar contact from the fixed breaker contact and thereby disconnect the circuit breaker from the line supply in an isolated configuration; and
- a motor fixed within the switchgear and coupled to the movable contact such that rotation of the motor causes the movable contact to move between the first and the second positions;
- wherein the first fixed busbar contact includes three fixed busbar contacts each fixed within the switchgear and each electrically coupled to respective ones of three line supply busbars each electrically coupled to a distinct phase of the line supply,
- wherein the fixed breaker contact includes three fixed breaker contacts each fixed within the switchgear and electrically coupled to a corresponding connector of the circuit breaker for supplying a respective one of the distinct phases to the circuit breaker,
- wherein the movable contact includes three movable contacts that are electrically conductive, and
- wherein the motor is coupled to the three movable contacts such that rotation of the motor causes the three movable contacts to move together between the first and second positions;
- three fixed ground contacts each fixed within the switchgear and electrically coupled to the main ground busbar, the motor causing the three movable contacts to move into and out of a third position;
- a ground shorting bar removably connected to a fixed main ground bar that is electrically coupled to the main ground busbar, the ground shorting bar being movable among a ground-engaged position and a ground-isolated position, the ground shorting bar electrically shorting the three fixed ground contacts together and being electrically connected to the fixed main ground bar in the ground-engaged position, the ground shorting bar being electrically isolated from the three fixed ground contacts and from the fixed main ground bar in the ground-isolated position; and
- a ground-bar engage motor mechanically coupled to the ground shorting bar such that rotation of the ground-bar engage motor causes the ground shorting bar to move among the ground-engaged position and the ground-isolated position.

13. The motorized drive system of claim 12, further comprising:
a first switch positioned in a movement path of the drive bar to close in response to the motor drive system being in the isolated configuration;
a second switch positioned in the movement path of the drive bar to close in response to the motor drive system being in the service configuration;
a third switch positioned in the movement path of the drive bar to close in response to the movable contact being in the third position; and
a light indicator assembly that includes a service light indicator for indicating that the motorized drive system is in the service configuration, an isolated light indicator for indicating that the motorized drive system is in the isolated configuration, and a grounded light indicator for indicating that the motorized drive system is in a grounded configuration, wherein the service, isolated, and grounded light indicators are visible from a front panel of the switchgear,
the isolated light indicator being switched on in response to the first switch being closed, the service light indicator being switched on in response to the second switch being closed, and the grounded indicator light being switched on in response to the third switch being closed, the ground shorting bar being in the ground-engaged position, and the circuit breaker being in a closed position in which movable contacts of the circuit breaker are contacting stationary contacts of the circuit breaker that are electrically coupled to the fixed breaker contacts.

14. The motorized drive system of claim 12, wherein the movable contact rotates between the first and second positions.

15. A motorized drive system for a disconnector used in electrical switchgear, comprising:
a fixed busbar contact fixed within the switchgear and electrically coupled to a line supply busbar within the switchgear that is electrically coupled to a line supply external to the switchgear;
a fixed breaker contact fixed within the switchgear and electrically coupled to a circuit breaker fixedly mounted within the switchgear;
a fixed ground contact fixed within the switchgear and electrically coupled to a main ground busbar that is electrically coupled to ground;
a movable contact that is electrically conductive and movable to a first position to electrically connect the fixed busbar contact with the fixed breaker contact in a service configuration and movable to a second position to electrically disconnect the fixed busbar contact from the fixed breaker contact and thereby disconnect a load protected by the circuit breaker from the line supply in an isolated configuration and movable to a third position in which the movable contact electrically connects the fixed ground contact to the fixed breaker contact;
a motor fixed within the switchgear and coupled to the movable contact such that rotation of the motor causes the movable contact to move among the first, second, and third positions;
a ground shorting bar removably connected to a fixed main ground bar that is electrically coupled to the main ground busbar, the ground shorting bar being movable among a ground-engaged position and a ground-isolated position, the ground shorting bar being electrically connected to the fixed main ground bar in the ground-engaged position, the ground shorting bar being electrically isolated from the fixed ground contact and from the fixed main ground bar in the ground-isolated position; and
a ground-bar engage motor mechanically coupled to the ground shorting bar such that rotation of the ground-bar engage motor causes the ground shorting bar to move among the ground-engaged position and the ground-isolated position.

16. The motorized drive system of claim 15, further comprising:
a first switch positioned to close in response to the motor drive system being in the isolated configuration;
a second switch positioned to close in response to the motor drive system being in the service configuration;
a third switch positioned to close in response to the movable contact being in the third position; and
a light indicator assembly that includes a service light indicator for indicating that the motorized drive system is in the service configuration, an isolated light indicator for indicating that the motorized drive system is in the isolated configuration, and a grounded light indicator for indicating that the motorized drive system is in a grounded configuration, the service, isolated, and grounded light indicators being visible from a front panel of the switchgear,
the isolated light indicator being switched on in response to the first switch being closed, the service light indicator being switched on in response to the second switch being closed, and an on status of the grounded indicator light being based on at least the third switch being closed.

17. The motorized drive system of claim 15, further comprising:
a receiver circuit that receives a signal instruction that is generated external to and remote from the electrical switchgear, the receiver circuit being operable to cause the motor to turn in response to receiving the signal instruction.

18. A motorized drive system for a disconnector used in electrical switchgear, comprising:
fixed busbar contacts each fixed within the switchgear and electrically coupled to respective ones of line supply busbars within the switchgear that is electrically coupled to a distinct phase of a line supply external to the switchgear;
fixed breaker contacts each fixed within the switchgear and electrically coupled to a corresponding connector of a circuit breaker fixedly mounted within the switchgear, each of the corresponding connectors supplying a respective one of the distinct phases to the circuit breaker;
fixed ground contacts each fixed within the switchgear and electrically coupled to a main ground busbar that is electrically coupled to ground;
electrically conductive movable contacts movable to a first position to electrically connect the fixed busbar contacts with the fixed breaker contacts in a service configuration and movable to a second position to electrically disconnect the fixed busbar contacts from the fixed breaker contacts and thereby disconnect a load protected by the circuit breaker from the line supply in an isolated configuration and movable to a third position in which the movable contacts electrically connect the fixed ground contacts to the fixed breaker contacts;

a motor fixed within the switchgear and coupled to the movable contacts such that rotation of the motor causes the movable contacts to move among the first, second, and third positions;

a ground shorting bar removably connected to a fixed main ground bar that is electrically coupled to the main ground busbar, the ground shorting bar being movable among a ground-engaged position and a ground-isolated position, the ground shorting bar electrically shorting the fixed ground contacts together and being electrically connected to the fixed main ground bar in the ground-engaged position, the ground shorting bar being electrically isolated from the fixed ground contacts and from the fixed main ground bar in the ground-isolated position;

a ground-bar engage motor mechanically coupled to the ground shorting bar such that rotation of the ground-bar engage motor causes the ground shorting bar to move among the ground-engaged position and the ground-isolated position;

a light indicator assembly that includes a service light indicator for indicating that the motorized drive system is in a service configuration in which the movable contacts are connected across the fixed busbar contacts and the fixed breaker contacts, an isolated light indicator for indicating that the motorized drive system is in an isolated configuration in which the movable contacts are disconnected from the fixed busbar contacts and from the fixed ground contacts, and a grounded light indicator for indicating that the motorized drive system is in a grounded configuration in which the movable contacts are connected across the fixed breaker contacts and the fixed ground contacts, wherein the service, isolated, and grounded light indicators are visible from a front panel of the switchgear; and a receiver circuit that receives a signal instruction that is generated external to and remote from the electrical switchgear, the receiver circuit being operable to cause the motor to turn in response to receiving the signal instruction.

* * * * *